Figure 1:
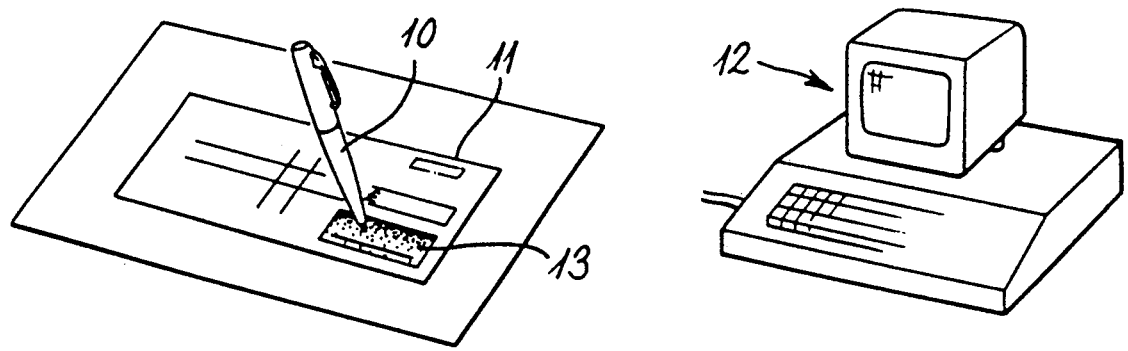

United States Patent [19]

Hilton

[11] Patent Number: 5,027,414
[45] Date of Patent: Jun. 25, 1991

[54] METHOD AND APPARATUS FOR CAPTURING INFORMATION IN DRAWING OR WRITING

[75] Inventor: Colin S. Hilton, London, England

[73] Assignee: National Research Development Corporation, London, England

[21] Appl. No.: 145,098

[22] Filed: Jan. 19, 1988

[30] Foreign Application Priority Data

Jan. 20, 1987 [GB] United Kingdom ............... 8701206
Apr. 22, 1987 [GB] United Kingdom ............... 8709502
Aug. 19, 1987 [GB] United Kingdom ............... 8719625

[51] Int. Cl.⁵ .......................................... G06K 9/20
[52] U.S. Cl. ........................................ 382/3; 382/13
[58] Field of Search ...................... 382/3, 13, 65, 34

[56] References Cited

U.S. PATENT DOCUMENTS

| | | | |
|---|---|---|---|
| 3,903,502 | 9/1975 | Moss | 340/146.35 Y |
| 3,955,178 | 5/1976 | Warfel | 340/146.3 SY |
| 4,078,151 | 3/1978 | McNeary | 178/18 |
| 4,122,435 | 10/1978 | Greenaway | 340/146.3 SY |
| 4,150,285 | 4/1979 | Brienza et al. | 250/203 |
| 4,227,044 | 10/1980 | Fencl | 178/19 |
| 4,475,240 | 10/1984 | Brogardh et al. | 382/59 |
| 4,560,830 | 12/1985 | Perl | 178/19 |

FOREIGN PATENT DOCUMENTS

| | | |
|---|---|---|
| 0035036 | 9/1981 | European Pat. Off. . |
| 0132241 | 1/1985 | European Pat. Off. . |
| WO86/04704 | 8/1986 | PCT Int'l Appl. . |
| 860254 | 2/1961 | United Kingdom . |
| 1012445 | 12/1965 | United Kingdom . |
| 1233335 | 5/1971 | United Kingdom . |
| 1290398 | 9/1972 | United Kingdom . |
| 1376742 | 12/1974 | United Kingdom . |
| 1480066 | 7/1977 | United Kingdom . |
| 1525259 | 9/1978 | United Kingdom . |
| 1528578 | 10/1978 | United Kingdom . |
| 2117154 | 10/1983 | United Kingdom . |
| 2154734 | 9/1985 | United Kingdom . |
| 2183071 | 5/1987 | United Kingdom . |
| 2201240 | 8/1988 | United Kingdom . |

OTHER PUBLICATIONS

IBM Technical Disclosure Bulletin, vol. 18, No. 7, Dec. 1978 (New York, U.S.A.) S. A. Darringer et al.: "Speed Pen", p. 2374.
IBM Technical Disclosure Bulletin, vol. 18, No. 10, Mar. 1976 (New York, U.S.A.) C. H. Bajoreck et al.: "Signature Recognition System Transducer", p. 3484.
IBM Technical Disclosure Bulletin, vol. 27, No. 11, Apr. 1985, pp. 6537–6539, New York, U.S.A.: "Electro-Optical Cursor Controller".

*Primary Examiner*—David K. Moore
*Assistant Examiner*—Yon Jung
*Attorney, Agent, or Firm*—Cushman, Darby & Cushman

[57] ABSTRACT

The forgery of signatures is made more difficult if the dynamic features of a signature can be checked when the signature is verified. Signatures to be verified are written with a pen which is sensitive to light received at its tip, each signature being written on an area having shading in intensity or color which varies with position. As the pen is moved a signal which depends on the light received by the pen varies in a way which is characteristic of the dynamic features of the signature. Verification is by comparing the time variation of the said signal with a previous authentic version as well as by comparing signatures. Comparison may be carried out automatically or by an operator who views a display of the authentic signal. The invention may also be used for data capture when characters are written on paper which has areas of different intensity or color of shading.

12 Claims, 2 Drawing Sheets

METHOD AND APPARATUS FOR CAPTURING INFORMATION IN DRAWING OR WRITING

The present invention relates to method and apparatus for generating signals as writing or drawing is carried out, the signals being dependent on the way in which the writing or drawing is carried out. The invention finds application particularly in signature verification and data capture.

Signature verification methods are known (UK Specification No. 1,480,066) in which the dynamic characteristics of signatures (characteristics obtained while the signature is being written) are used in signature verification.

Apparatus for identifying characteristics of handwriting by U.S. Pat. No. 4,122,435 and similar apparatus for signature verification is described in U.S. Pat. No. 3,955,178. The same principle is used in the signature verifier described in the IBM Technical Disclosure Bulletin, Volume 18, No. 7, December 1975. A disadvantage of this method is the complexity of equipment required to sense the vibrations set up when the pen crosses a groove.

A known alternative which also suffers from the disadvantage of complexity is passing electrical signals into a grid of electrical conductors, the signals being representative in some way of the position of a conductor in the grid, and sensing signals using a pen whose position is to be determined. An example of such apparatus is described in U.S. Pat. No. 4,560,830.

Other alternatives are described in European Patent Specification 0132241 where dynamic signatures are obtained by signing over a bar code using a light sensitive wand and European Patent Specification 0035036 where the direction of movement of a pen is determined from the output of light sensitive devices surrounding the tip of the pen. Further alternatives are described in UK Application No. 8626411 and the equivalent PCT Application No. GB86/00681, and also in UK Application No. 8702302 where a pen is used with lined paper and a temporal analysis of line crossings in writing a signature is carried out.

According to a first aspect of the present invention there is provided a method of obtaining information as writing or drawing is carried out, comprising the steps of using the tip of a writing or drawing instrument to write or draw in relation to a surface having shading which varies with position, and deriving an output signal from light reflected or transmitted by the surface at the point where the tip is currently located which is representative of the shading at the said point.

According to a second aspect of the present invention there is provided apparatus for obtaining information as writing or drawing is carried out comprising sensing means for deriving an output signal from light reflected or transmitted by a surface at a point where the tip of a writing or drawing instrument is currently located, the surface being suitable for writing or drawing and having shading which varies with position, and the sensing means being so arranged that the said output signal is representative of the shading at the said point.

The shading may vary with position in, for example, intensity and/or colour.

The shading may or may not be visible to the human eye, for example the shading may be in an ink which reflects ultra-violet light.

Where the shading is in intensity, the amount of light reflected or transmitted by the said surface may increase parallel to a straight line in the surface. For example where signature recognition is required the person signing may be required to sign in an area of a cheque, for example, which is shaded in intensity from top to bottom.

The first and second aspects of the invention may then also include the display of a graph of the magnitude of the said output signal versus time. Where the invention is used for signature verification the display can be compared with a similar display generated from stored signals representing an authentic signature. A main advantage of the invention is that an operator can compare both normal signatures and dynamic signatures shown on the display, making the task of a forger far more difficult.

As an alternative the output signal may be digitised and compared by a computer with values obtained from an authentic signature.

The surface may be divided into a plurality of areas each of which is divided into a further plurality of regions. Considering the whole surface, the regions form groups with the regions in each group arranged to reflect or transmit light by a constant amount, or to have the same colour. The regions of each group are interspersed in the areas with those of other groups. Data entry is carried out by writing characters representing data in respective areas with a character traversing, typically, five to ten regions. Analysis of the regions entered and the sequence in which the regions were traversed indicates the character entered. Such a method of data entry is simple for an operator since a special purpose pen can be used to enter the data on printed stationery bearing areas divided up into the said regions.

Preferably the writing or drawing instrument of the first and second aspects of the invention leaves a line when it is used. The line may, for example, be formed by ink or particles from a pencil, or a stylus may be used which, for example, releases material from the paper either on the upper surface or in a similar way to carbon paper.

The output signal representative of light reflected or transmitted by the surface may be generated in the ways described in U.K. Patent Application No. 8626411 and the equivalent PCT Application No. GB86/00681, and in U.K. Application No. 8702302. For this purpose the writing instrument may contain a light source or alternatively ambient light may be used to illuminate the surface. The writing or drawing instrument may, for example, sense light received at its tip and transmit a signal representative of the light intensity received to a computer, for instance by radio, ultrasonics or by means of a physical electrical connection.

Alternatively the surface may be transparent or translucent while carrying the said shading to modify the amount of light received dependent on position, and a light receiver may be positioned beneath the surface to generate the said output signal.

The writing or drawing instrument may be as described in U.K. Patent Application No. 8626411 and its PCT equivalent.

In this specification the word "reflection" includes both specular and scattering reflection and the word "light" includes visible, infra-red and ultra-violet light, where ink or another writing medium appears when the writing instrument is used and the writing instrument contains light sensing means then, in almost all situations, the wavelengths of light transmitted or reflected by the marking on the surface must be different from those reflected or absorbed by the ink or other similar material.

Figure 3:
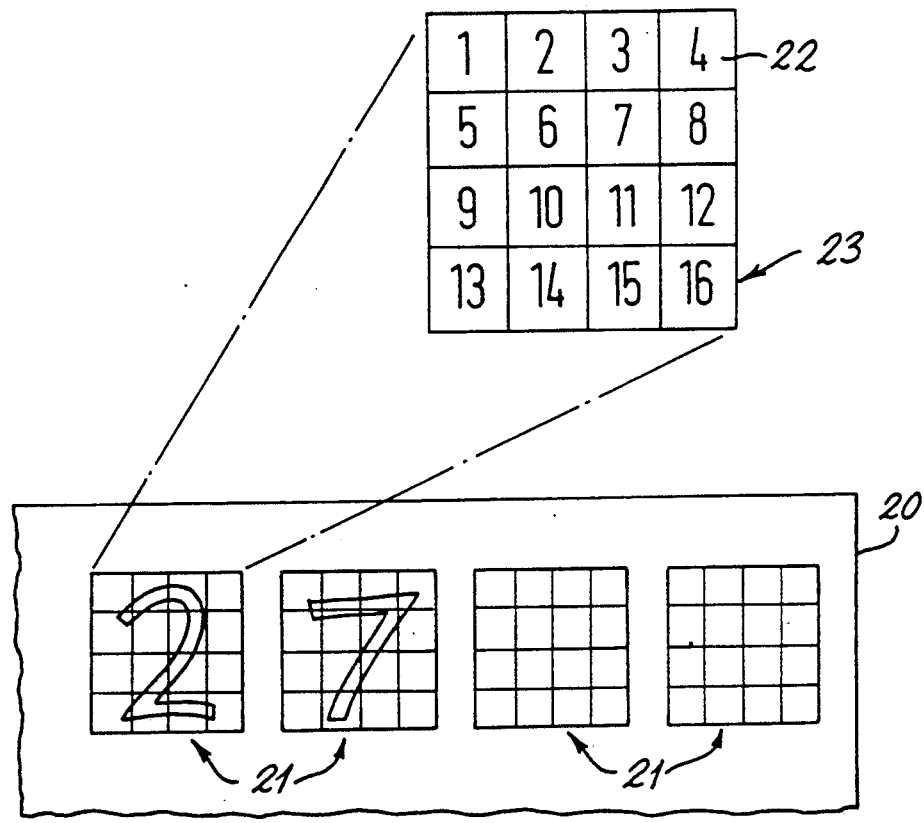
Figure 2A:
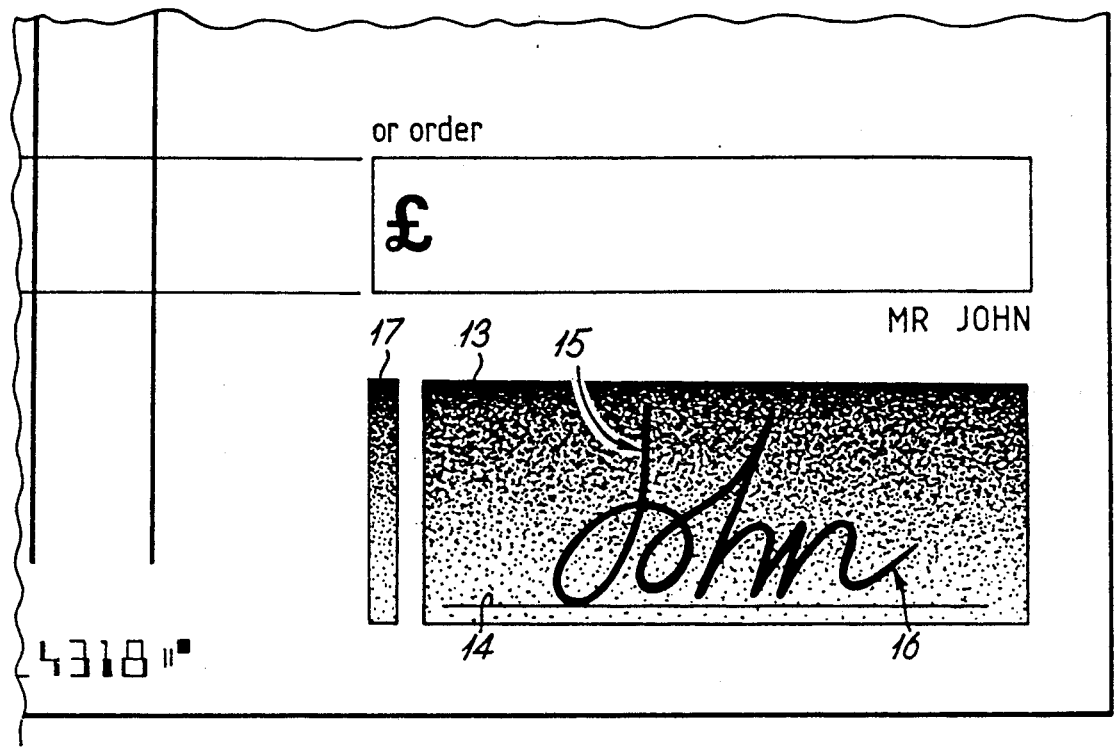
Figure 2B:
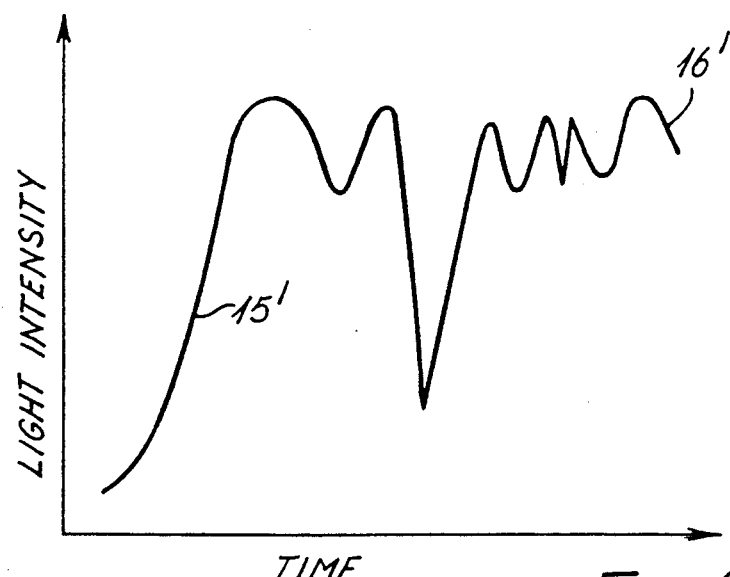

Certain embodiments of the invention will now be described by way of example, with reference to the accompanying drawings, in which:

FIG. 1 illustrates in outline apparatus according to one embodiment of the invention, FIG. 2a shows part of a cheque embodying a feature of the invention, FIG. 2b shows a display obtained in using one embodiment of the invention, and FIG. 3 illustrates a method of data capture according to the invention.

In FIG. 1 a pen 10 is shown as though in use for signing a cheque 11. The pen is constructed to write and at the same time receive ambient light reflected from the point at which the tip of the pen makes contact with the surface on which writing is carried out. In addition the pen includes means for transmitting to a computer 12, for example by radio, a signal representative of the intensity of light currently received. Suitable pens are, as mentioned above, described in UK Patent Application No. 8626411 and the equivalent PCT application.

The signature is written on an area 13 of the cheque which is shown on a larger scale in FIG. 2a and which has a background which varies in intensity from the top to the bottom of the area 13 as shown. A line 14 is provided to indicate where the signature should be written.

In the example of FIG. 2a, as the down stroke 15 of the "j" of "john" is written, the light received by the pen 10 increases in intensity as indicated by the portion 15' of the graph of FIG. 2b, where intensity of light received by the pen is plotted against time. As writing is continued, the remainder of the waveform of FIG. 2b is developed until the final upstroke 16 of the "n" is represented by the part 16' of the waveform. Since operation depends on the pen sensing the intensity of shading in the area 13, light sensing means in the pen must respond to light of wavelengths other than those absorbed or reflected by the ink used by the pen.

The computer 12 is programmed to display the graph of FIG. 2b. Preferably the computer is also programmed to display at the same time a similar graph based on stored values obtained from one or more previous signatures by the genuine signature owner. An operator checking a signature written in a bank or at a point of sale is then able to compare not only the signature itself with a version of the signature which may also be displayed by the computer but also the two waveforms. Clearly it is much more difficult for a forger to produce a forgery which is accurate both as an ordinary signature and as a cynamic signature displayed as a graph of pen tip position versus time.

Since variations in the shading of the area 13 occur in printing, it is advisable to include an area 17 shaded in the same way as the area 13. A person signing is then required, preferably before signing, to run the pen up or down the area 17 from one edge to the other. The resulting signal is then used by the computer 12 to calibrate the scale of the light intensity axis in FIG. 2b.

The cheque 11 may of course be replaced by any document on which a signature is to be written and in particular the slips used when transactions are made using credit cards.

In an alternative the intensity of the background of the area 13 may increase from bottom to top or from left to right, although the latter is not so effective in producing a characteristic dynamic signature.

The light sensing means in the pen is likely to be able to distinguish several thousand shades of intensity. Thus if pieces of paper are printed with, for example, 2000 rectangles each of a different shading intensity unique thereto, the position of the pen tip can be determined by the computer from the level of light received. For this purpose the computer must be loaded with information specifying where each intensity is on each piece of paper. The intensities may be set out in a logical order but it is not necessary that they are.

The signal received by the pen may be calibrated in the way mentioned above but as an alternative or in addition, the pen or the computer may include means for sensing ambient light. The signal generated in this way can be used to allow for changing ambient light conditions.

Another way in which the invention can be used is for data capture. In FIG. 3 part of a form 20 is shown which has areas 21 for data entry by means of a pen of the type mentioned in connection with FIG. 1. Each area 21 is divided into a plurality of small rectangular regions 22 as shown in the enlargement 23 of one of the areas 21. Each small rectangle is shaded throughout to the same degree but the intensities of shading in the various rectangles are indicated by the numbers shown in FIG. 3. For example the rectangle numbered 1 may have no shading while those numbered 2 to 16 have respective increases in the intensity of shading. As before the pen writes in an ink which has a colour which does not obscure the colour in which shading is carried out.

Using the numbers shown in FIG. 3 to indicate intensity, entering the data character "2" shown in the left-hand box 21 generates the following sequence as it is written: 5,2,3,7,11,10,14,15,16. In addition other intensities will be produced for short periods when the boundaries between regions are crossed but the computer 12 is programmed to omit from the sequence intensities which are between the discrete values obtainable when the pen tip is inside the various regions. As indicated by comparison for the sequence 1,2,3,4,7,11,10,14 for the number 7, each number and letter has a characteristic sequence. A problem may arise where a character is written in such a way that the pen passes directly over the border between adjacent rectangles., for example in writing the character "7" the first four numbers in the sequence would then be half derived from the sequence 5,6,7,8. For this reason persons using the method of data entry described are instructed to ensure that they write as far as possible on the small rectangles and not on the borders between them except when crossing the borders. Alternatively the size of the rectangles can be reduced to increase resolution when the problem is unlikely to occur because there is then more information available overall to the computer from which to determine a track taken by the pen tip.

As has been indicated above, the invention may be put into effect in many different ways than those specifically described. For example a pen may be used which emits light from its tip, the light being received by a photosensitive device beneath the writing surface which is transparent or translucent. The "half-tone" method may be used to provide the shading.

Though the invention may employ a pen to detect the various intensities of light transmitted from patterns printed on paper, it need not be so restricted. Any of the different patterns of light herein described may be effected by other means. For example, they may be projected onto plain paper, either from a light source beneath a surface supporting the paper when a surface which transmits light is employed, or else by illumination from above the paper. Alternatively the material on which the pattern is printed may be interposed between the light source and the surface, for example, or between the surface and the paper itself.

Although the embodiments specifically described utilise shading in one colour only, the shading may be replaced by different colours. For example in FIG. 2a, the block 13 may change gradually between colours from top to bottom and/or from left to right, and in FIG. 3 the numbers in the rectangles may represent different colours. The light receiver, in the pen, for example, is then sensitive to colours as well as light intensities. The shading in the block 13 may be in discrete bands whether of different constant intensities or intensities which vary along the length of the bands. The sequence in which the bands are set out in one direction need not be one of continual increase or decrease in intensity even to produce a signal of the general type shown in FIG. 2b so long as the computer is loaded with information representing the sequence and can interpret the intensity of each band in terms of position.

Using different colours, the position of the pen over the whole area of the paper can be indicated, where shading in one colour—say red—is graduated in intensity from the top to the bottom of the paper and superimposed by a different colour—say blue—graduated from left to right, an orthogonal coordinate system is provided.

To locate the pen position, a light sensitive device in the pen, for example, samples that component of light reflected or transmitted by the first colour before going on to sample that component reflected or transmitted by the second colour. The light sensitive device responds to input from light of different spectra illuminating the paper in turn, say substantially red light succeeded by substantially blue light and so on. Signals derived from the red light provide information on the position of the pen along the vertical axis whilst those derived from the blue light determine the position relative to the horizontal axis.

Preferably the pen includes two light sources of different colours which are switched on alternately to illuminate the paper. The pen may have a body which is transparent, when the light sources can be in a part of the pen which is remote from the tip but the body guides the light to the tip where it is emitted to illuminate the paper around the tip. The pen may be of the rollerball type but with a transparent ball at its tip and a light guide for transmitting light from the ball to the light sensitive device (as is described in the above mentioned UK Application No. 8626411). If so, the light path by way of the ball and the guide must be light-insulated from the coloured light sources and the transparent pen body. The light sensitive device may be sensitive to light of both colours when signals representing the two position coordinates are separated according to the time received in relation to the times at which the two colours illuminate the paper.

Alternatively the light sensitive device may have separate sections sensitive to light of different colours, respectively. For example each section may employ a filter corresponding to the colour it is to receive. With this arrangement the two light sources may provide constant illumination, not alternately one on and then the other, or a single constant source may be used having a spectrum which includes both colours. Also, the two sections of the light sensitive device then remain in constant operation, not time multiplexed.

I claim:

1. A method of obtaining information as writing or drawing is carried out, comprising
   using a tip of a writing or drawing instrument to write or draw symbols in relation to a surface having shading which varies with position, the surface being of a type which is divided into a plurality of areas with each area being divided into a number of regions and each region having a color characteristic which is different from that of all the other regions in that area,
   deriving an output signal from light reflected or transmitted by the surface at a point where said tip is currently located, said output signal being representative of the color characteristic of said shading at said point,
   said symbols being written or drawn in respective ones of said areas with each symbol extending to several of said regions in that area,
   detecting, from said output signal, a sequence of regions entered in writing or drawing each symbol, and
   analyzing said sequences obtained to indicate which symbols have been written or drawn.

2. A method according to claim 1 wherein each symbol is an alpha-numeric character.

3. A method according to claim 1 wherein each symbol is a signature.

4. A method according to claim 1 wherein each symbol is a word.

5. A method of obtaining information as writing or drawing is carried out, comprising the steps of:
   providing a surface which is used for writing or drawing and which is divided into a plurality of regions each having shading with a color characteristic unique thereto, and which varies with position;
   using a tip of a writing or drawing instrument to write or draw in relation to said surface, and
   deriving an output signal from light reflected or transmitted by the surface at a point where said tip is currently located, which is representative of said shading at said point.

6. Apparatus for obtaining information as writing or drawing is carried out, comprising:
   a surface on which, in operation, writing or drawing symbols is carried out, said surface being divided into a number of areas, each area being divided into a plurality of regions with each region having a color characteristic which is different from that of all said other regions in that area, and symbols being written or drawn in respective ones of said areas with each symbol extending into several of said regions of that area,
   sensing means for deriving an output signal from light reflected or transmitted by said surface at a point where a tip of a writing instrument is currently located, said sensing means being so constructed that said output signal is representative of said color characteristic of said shading at said point, means for detecting, from said output signal, a sequence of regions entered in each said area in writing or drawing each symbol, and means for analyzing said sequences obtained to indicate which symbols have been written or drawn.

7. Apparatus according to claim 6 further comprising means for projecting light on to said surface to provide said shading.

8. Apparatus for obtaining information as writing or drawing is carried out comprising a surface for writing or drawing having shading which varies with position, wherein substantially a whole of that part of said surface which is used for writing or drawing is divided into a plurality of regions each having a color characteristic unique thereto, sensing means for deriving an output signal from light reflected or transmitted by said surface at a point where a tip of a writing instrument is currently located, and analysis means for storing information relating to said color characteristic of each said region, said analysis means being arranged to determine at least one of a position of said tip and a shape of its path over said surface from said output signal and said information.

9. A method of signature verification comprising:

using a tip of a writing instrument to write a signature to be verified on a surface, wherein said surface on which a signature may be written has shading which has a color characteristic which varies gradually with position, deriving an output signal from light reflected or transmitted by the surface at the point where the tip is currently located which is based on and representative of said color characteristic of the shading at said point, and comparing a representation of the output signal versus time with a stored representation of the output signal versus time obtained when a genuine signature was written.

10. A method of signature verification as in claim 9 wherein the step of comparing representations of the output signal is carried out automatically.

11. Apparatus for signature verification when a signature is written on a surface having shading which has a color characteristic which gradually varies with position, wherein that part of said surface which may be used for writing signatures has shading which has a color characteristic which varies gradually with position, the apparatus comprising:

sensing means for deriving an output signal from light reflected or transmitted by said surface at a point where a tip of a writing instrument for writing signatures is currently located, said sensing means being so constructed that said output signal is based on and representative of the said color characteristic of said shading at the said point, and means for comparing a representation of the output signal versus time with a stored representation of the output signal versus time obtained when a genuine signature was written.

12. Apparatus according to claim 11 wherein the means for comparing includes means for automatically comparing the said representation.

* * * * *